Feb. 16, 1937.    R. HILL    2,071,303
MEANS FOR DRY ICING
Filed April 4, 1935
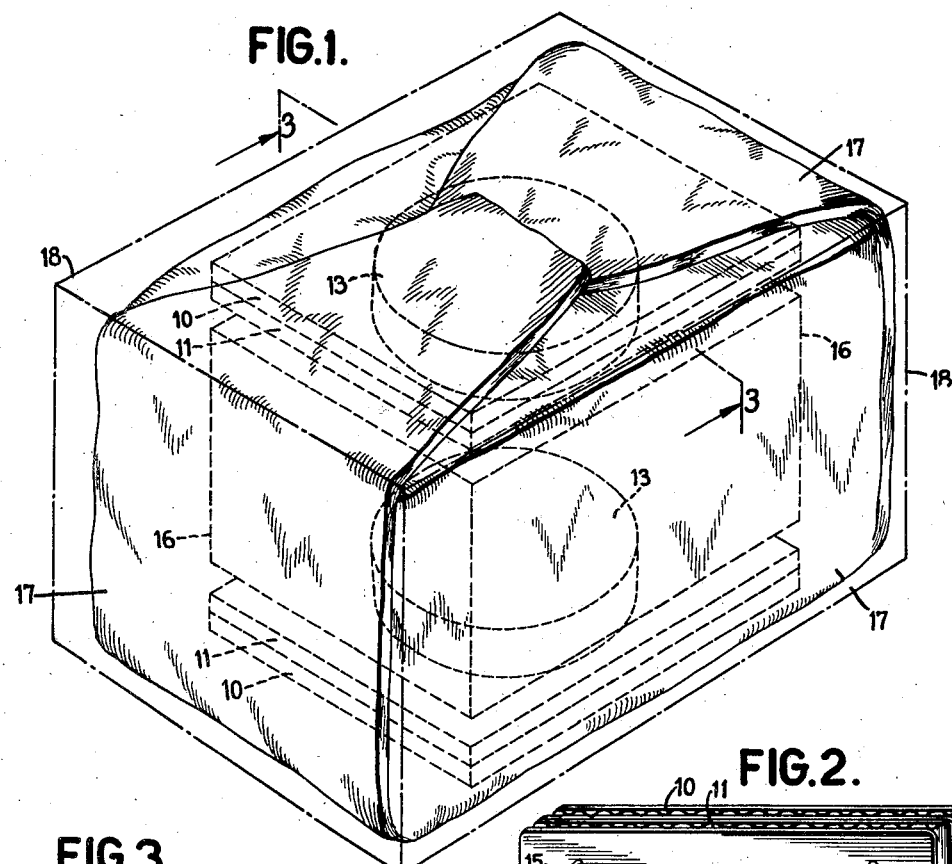
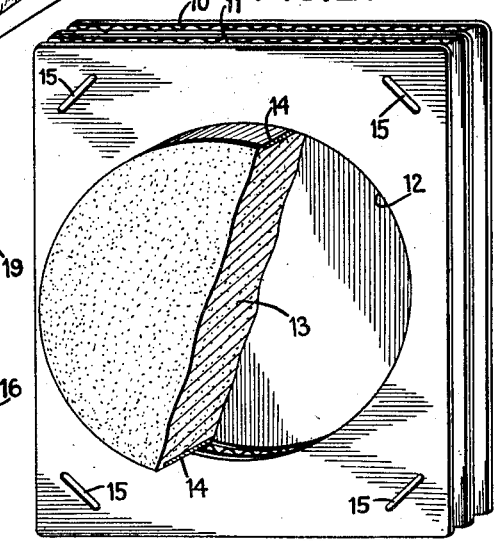
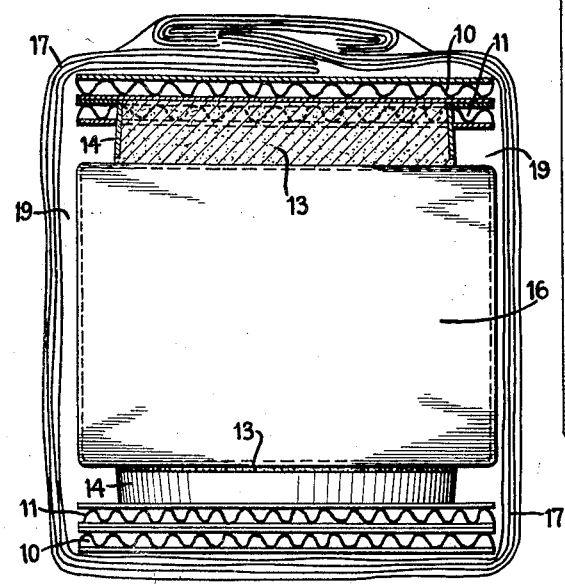
INVENTOR
Reuben Hill
BY
Cooper, Kerr & Dunham
ATTORNEYS Patented Feb. 16, 1937

2,071,303

UNITED STATES PATENT OFFICE 2,071,303

MEANS FOR DRY ICING

Reuben Hill, Detroit, Mich., assignor to Albert J. Smith, Richmond Hill, Long Island, N. Y.

Application April 4, 1935, Serial No. 14,631

2 Claims. (Cl. 62—91.5)

Carbon dioxide ice (commonly called "dry ice") is now frequently used for refrigerating purposes and for keeping refrigeratable products in cold condition. The application of such carbon dioxide ice to such products for such purposes is commonly called "dry icing" and such terminology will be hereinafter used with reference to such methods of utilizing carbon dioxide ice.

In previous methods of dry icing, individual cartons of ice cream or similar refrigeratable material, it has been the practice to place a piece of cut out dry ice loosely in an outer carton and over such piece of dry ice to place a carton of ice cream and on the top of this ice cream carton to place more dry ice and then close the carton. This type of container and method of dry icing of ice cream cartons has been found objectionable in several respects. The ice cream in the ends of the carton received excessive cold from the dry ice and became extremely hard. The ice cream in the center of the carton, due to rapid heat transfer thereinto from the sides was relatively soft. Furthermore, the dry ice at the ends of the carton received considerable amounts of heat through the end walls of the container. Furthermore, considerable quantities of dry ice were required for former methods of dispensing, since the quantity placed in the carton was left to the discretion of the attendant and was often incorrectly measured.

The present invention has for its object the provision of a novel carton for dry icing and the provision of a novel method of dry icing which will minimize and obviate the foregoing difficulties.

Another object of the present invention resides in the provision of a novel carton and method of dry icing which will substantially equalize the temperature throughout the brick of ice cream or other refrigeratable commodity and which will furthermore maintain a required temperature for a prescribed length of time with a relatively smaller amount of dry ice.

A further object of the present invention resides in the provision of a novel carton and method of packing which will permit the utilization of a pre-formed cake of dry ice of definite size and shape to provide cooling for a definite cooling period.

Further and other objects of the present invention will be hereinafter set forth in the accompanying specification and claims and shown in the drawing which shows by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawing:

Figure 1 shows the complete package with the outer carton and with the interior parts shown in dotted lines;

Fig. 2 is a detail view showing one of the constituent parts of the container showing a retainer for a dry ice cake with the dry ice cake in such retainer; and Fig. 3 shows the package prior to being placed in the outer carton. This view is taken on line 3—3 of Fig. 1.

In more detail in the drawing, 10 designates a rectangular piece of commercial corrugated packing board. 11 is a similar rectangular piece of board which is provided with a perforation extending wholly therethrough as shown at 12. This perforation at 12 is of such size as to receive a cake of dry ice 13. The cake of dry ice may be provided with a paper ring 14 at its periphery to facilitate handling.

In practice, the two elements 10 and 11 may be secured together to form a unitary assembly in any desired manner as by gluing the same or by wire stapling as indicated at 15.

When it is desired to dry ice a commercial package of ice cream or like refrigeratable commodity, the dispenser takes the carton of ice cream 16 from the refrigerator. He then takes two cakes of dry ice 13 and places each cake in the recess in each board assembly. Thereafter the two assemblies are placed in contact with carton 16 in such a manner that the dry ice cakes 13 are in contact with the carton 16. Preferably the dry ice cakes contact the sides of the package 16 as shown in Fig. 3. They may, however, be placed at the ends, but the side relation is preferable. For multiple packing the assemblies may be used at the outer ends and a dry ice cake may be placed between the separate ice cream cartons 16. Thereafter these parts, including the two assemblies and the carton, are loosely wrapped in four-ply newsprint. The newsprint is indicated at 17 in Fig. 3. This loosely wrapped package is then placed in the outer customer or carrying carton 18.

By the use of the foregoing container and method of packing there is direct heat conductivity between the face of the dry ice cake and the side of the ice cream carton 16. The gases of sublimation from the cakes of dry ice also pass through the corrugations of the elements 11 into the space 19 which is within the wrapping 17. These gases act as supplemental heat insulators and also cool the intermediate parts of the carton. The outer elements 10 of each assembly act as insulators to prevent direct outward passage of the cold from the cakes of dry ice. The multi-ply newsprint paper wrapping 17 serves as an effective heat insulator and also confines the sublimed carbon dioxide gas within the package and in proximity to the carton 16 and wholly around the carton 16.

It will be understood that by using the foregoing carton and method of packing that preformed dry ice cakes of a determined size may be utilized and that such cakes will serve to refrigerate the carton of refrigeratable commodity for a determined period of time. The quantity of dry ice may be materially diminished with respect to that used with present practice and furthermore the commodity will be kept in better condition.

What I claim is:

1. A carbon dioxide ice carton for a refrigeratable material adapted for insertion in an outer customer carton comprising an outer multi-ply paper wrapping, means affording a recess adapted for the reception of a carbon dioxide ice cake for disposition at each side of refrigeratable material with the carbon dioxide ice in contact with the carton containing such material, said means having passages for delivering sublimed gases outwardly to the interior of the aforesaid multi-ply wrapping, said means also having heat insulating end portions to hinder the direct outward transfer of cold from the carbon dioxide ice cakes to the ends of the package through the wrapper.

2. A carbon dioxide ice carton for dry icing a commercial carton of refrigeratable material, comprising an outer customer carton, an inner multi-ply newsprint wrapping around the commercial carton and defining a gas retaining space therebetween, a pair of carbon dioxide ice cake containing assemblages, each comprising a corrugated paper board element recessed to receive a carbon dioxide ice cake with a supplementary corrugated paper element to heat insulate the carbon dioxide ice cake received in the first mentioned element at the outer face of the cake, the interstices of the corrugations of the first mentioned element conducting sublimed gases from the carbon dioxide ice cake outwardly to the space within the multi-ply paper wrapping for the purpose described.

REUBEN HILL.